US009897014B2

(12) United States Patent
Scott et al.

(10) Patent No.: US 9,897,014 B2
(45) Date of Patent: Feb. 20, 2018

(54) VARIABLE RATE PUSH/PULL TWIST THROTTLE

(75) Inventors: Steven Richard Scott, Belmont, CA (US); Chris Van Andel, Menlo Park, CA (US)

(73) Assignee: Motion Pro, INC., Loomis, CA (US)

( * ) Notice: Subject to any disclaimer, the term of this patent is extended or adjusted under 35 U.S.C. 154(b) by 1914 days.

(21) Appl. No.: 12/570,161

(22) Filed: Sep. 30, 2009

(65) Prior Publication Data

US 2010/0089365 A1 Apr. 15, 2010

Related U.S. Application Data

(60) Provisional application No. 61/105,732, filed on Oct. 15, 2008.

(51) Int. Cl.

| | |
|---|---|
| ***F02M 25/07*** | (2006.01) |
| ***B01J 2/28*** | (2006.01) |
| ***B01J 21/08*** | (2006.01) |
| ***B01J 21/12*** | (2006.01) |
| ***B01J 37/00*** | (2006.01) |
| ***B24D 3/02*** | (2006.01) |
| ***B32B 21/12*** | (2006.01) |
| ***B41M 5/52*** | (2006.01) |
| ***C01B 33/141*** | (2006.01) |
| ***C04B 14/04*** | (2006.01) |
| ***C09C 1/30*** | (2006.01) |
| ***F02D 11/02*** | (2006.01) |

(Continued)

(52) U.S. Cl.
CPC ............ *F02D 11/02* (2013.01); *F02D 9/1065* (2013.01); *F02D 11/04* (2013.01)

(58) Field of Classification Search
CPC ......... B62K 23/04; F02D 11/02; F02D 11/04; F02D 9/1065
USPC ........ 74/500.5, 488, 489, 501.6; 440/63, 87; 477/34
See application file for complete search history.

(56) References Cited

U.S. PATENT DOCUMENTS 2,651,278 A * 9/1953 Taito Davison et al. ........ 440/87
3,922,996 A * 12/1975 Meyer ............................ 440/87

(Continued)

FOREIGN PATENT DOCUMENTS

DE 3201523 A1 * 7/1983 ............ B62K 23/04
DE 43 33 701 A1 4/1995

(Continued)

OTHER PUBLICATIONS

Machine Translation of JP 2003-193869, Takeuchi Masayuki, Jul. 9, 2003.*

(Continued)

*Primary Examiner* — Vinh Luong
(74) *Attorney, Agent, or Firm* — Larry B. Guernsey; Patent Law Office of Larry Guernsey

(57) ABSTRACT

A variable rate throttle for controlling a vehicle carburetor having control cables. The variable rate throttle includes a housing surrounding a cavity, a plurality of interchangeable throttle reels, each throttle reel having a different track radius, where a particular one of the throttle reels is positioned at a time in the cavity of the housing and which engages the control cables. A throttle handle engages the interchangeable throttle reel so that rotation of the handle causes rotation of the throttle reel and thus moves the control cables of the vehicle carburetor.

20 Claims, 8 Drawing Sheets

(51) Int. Cl.

| | |
|---|---|
| ***F02D 9/10*** | (2006.01) |
| ***F02D 11/04*** | (2006.01) |

(56) References Cited

U.S. PATENT DOCUMENTS

| | | | | | |
|---|---|---|---|---|---|
| 4,041,797 | A * | 8/1977 | Mito | 74/500.5 |
| 4,794,820 | A * | 1/1989 | Floeter | 477/34 |
| 4,829,438 | A * | 5/1989 | Etoh | 701/94 |
| 4,838,820 | A * | 6/1989 | Boda et al. | 440/87 |
| 7,090,551 | B1 * | 8/2006 | Lokken et al. | 440/63 |
| 2003/0150287 | A1 * | 8/2003 | Lev-Ran | 74/488 |
| 2004/0216550 | A1 * | 11/2004 | Fallak et al. | 74/551.9 |
| 2006/0053936 | A1 * | 3/2006 | Wancket | 74/501.6 |
| 2013/0205735 | A1 * | 8/2013 | Schmidt | A01D 34/47 56/11.1 |

FOREIGN PATENT DOCUMENTS

| | | | | | |
|---|---|---|---|---|---|
| DE | 44 42 109 | A1 | | 6/1995 | |
| DE | 4442109 | A1 | | 7/1995 | |
| EP | 1 464 571 | A2 | * | 10/2004 | B62K 23/04 |
| EP | 1 479 891 | A2 | | 11/2004 | |
| EP | 1 541 457 | A1 | * | 6/2005 | B62K 23/04 |
| EP | 3001016 | A1 | * | 3/2016 | |
| GB | 750 478 | A | | 6/1956 | |
| GB | 2 322 909 | A | * | 9/1998 | B62K 23/04 |
| JP | 59-53917 | | * | 3/1984 | G05G 9/00 |
| JP | 2-303989 | | * | 12/1990 | B62K 23/04 |
| JP | 4-254278 | | * | 9/1992 | B62K 11/14 |
| JP | 8-268368 | | * | 10/1996 | B62K 23/04 |
| JP | 2003 193869 | A | | 7/2003 | |
| JP | 2008-232016 | | * | 10/2008 | B62K 23/04 |

OTHER PUBLICATIONS

Machine Translation of EP 1464571, Fallak et al., Oct. 6, 2004.*

PTO STIC Translation of EP 1464571, Klaus Fallak et al., Jun. 2004.*

* cited by examiner

VARIABLE RATE PUSH/PULL TWIST THROTTLE

The following is a non-provisional patent application which claims priority to provisional application 61/105,732 filed Oct. 15, 2008 to the same inventors.

TECHNICAL FIELD

The present invention relates generally to devices for adjusting fuel flow to engine carburetors and more particularly to hand throttles for motorcycle engines.

BACKGROUND ART

Motorcycles and other small vehicles typically use a hand throttle to regulate the speed and acceleration of the vehicle, as opposed to using a gas pedal. The hand throttle is generally used in a rotary manner, so that the rider twists the hand throttle to increase the speed from minimum (idle) to maximum. The hand throttle is linked to a carburetor or fuel injected throttle body, and this linkage allows the twisting of the hand throttle to control the operation of the carburetor or throttle body by controlling the amount of fuel and air that flows through the carburetor or throttle body.

FIG. 2 illustrates elements of a carburetor 2, as mounted on an engine 1. The carburetor 2 is a device that mixes air and fuel for an internal combustion engine. The majority of older motorcycles are carbureted and new motorcycles are fuel injected. The carburetor and fuel injection system works on Bernoulli's principle, which is that moving air has lower pressure than still air, and that the faster the movement of the air, the lower the pressure.

The air flow in the carburetor 2 is controlled by rotational movement of a bell crank 3, which is connected to butterfly valves (not shown) in the interior of the carburetor 2 through movement of the butterfly shaft 4. The rotation of the bell crank 3 is implemented by movement of a push cable 5 and a pull cable 6 which are attached to the bell crank 3. Barrel wire end fittings 8 at the end of the cables 5, 6, are lodged in capture notches 9 in the bell crank 3 to secure them. Thus, there is a type of pulley system created by which the throttle on the handle acts to rotate the bell crank 3 and thus open and close the internal butterfly valves through the butterfly shaft 4.

Acceleration of the vehicle ranges from a minimum, where the engine idles, to maximum acceleration, and the opening of the butterfly valves in the carburetor or throttle body over this range can vary from a gradual increase over a relatively large angular twist range of the hand throttle to a very sharp increase from minimum to maximum over a relatively small twist range of the hand throttle.

If the carburetor or throttle body control is sensitive to angular rotation, a small rotation of the hand throttle will result in a large carburetor or throttle body adjustment. Conversely, if the carburetor or throttle body control is less sensitive, the hand throttle twist range between minimum and maximum acceleration will be larger, allowing finer control. This degree of control or sensitivity will be referred to as the "throttle rate". A throttle which goes from minimum to maximum in a small angular range will be referred to as having a "fast rate", and one which has a large throttle angle range will be referred to as having a "slow rate".

Different rates are useful for different situations and environments. For example, a rider in the desert who is on very flat terrain with no obstacles may be primarily interested in applying maximum acceleration as quickly as possible, and therefore a more sensitive throttle with a fast rate may be preferred. Conversely, a rider in the woods who is operating in hilly terrain, or in rain or mud-slickened conditions, may want to have more precise control, and thus a less sensitive throttle with a slow rate is preferred.

Typically, a vehicle is configured to have a fixed throttle rate, which is not variable. Modifying the throttle rate is not an operation which is easily done.

Thus, there is a need for a throttle which can be easily modified to produce a variety of throttle rates to provide varying sensitivity and thus variable throttle control.

DISCLOSURE OF INVENTION

An advantage of the present invention is that it provides a throttle assembly that is easily modified to change the throttle rate.

Another advantage of the present invention is that it provides a throttle assembly with interchangeable throttle reels.

And another advantage of the present invention is that it provides a throttle assembly which includes elbows with flared portions which allow optimum routing of cables to a variety of throttle reels of differing radii.

A further advantage of the present invention is that it provides a throttle assembly which works with push/pull cables of a standard carburetor or throttle body to provide a variable throttle rate.

A yet further advantage is that it provides a throttle assembly which can be easily retrofitted to existing carburetor or throttle body with minimal modification.

Another advantage of the present invention is that it provides a throttle assembly with throttle reels having varying track radii, and varying capture notch angles.

And another advantage of the present invention is that the reels have been designed to eliminate the need to make cable adjustments when changing throttle reels having varying track radii.

A further advantage of the present invention is that the capture notch locations for the pull cable have been designed so that the throttle handle will not rotate on the handlebar when you change throttle reels having varying track radii. This eliminates the need to make cable adjustments when using a directional grip with a specific pattern that requires it to be kept in the same position for rider comfort and or performance.

A further advantage of the present invention is that the reels have been designed so that they can only be installed onto the throttle handle in one direction, thus eliminating the possibility of putting the reels on incorrectly.

A further advantage of the present invention is that the reels have been designed so that the inner wire is captured between the side walls of the reel to prevent the inner wire from getting caught between the side of the reel and throttle housing.

A further advantage of the present invention is that the capture notches on the reels have been located to prevent the need to adjust the cables when changing the reels.

Briefly, one preferred embodiment of the present invention is a variable rate throttle for controlling a vehicle carburetor having control cables. The variable rate throttle includes a housing surrounding a cavity, a plurality of interchangeable throttle reels, each throttle reel having a different track radius, where a particular one of the throttle reels is positioned at a time in the cavity of the housing and which engages the control cables. A throttle handle engages the interchangeable throttle reel so that rotation of the handle causes rotation of the throttle reel and thus moves the control cables of the vehicle carburetor.

These and other advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which.

BEST MODE FOR CARRYING OUT THE INVENTION

The present invention is a variable rate push-pull throttle assembly, which will be referred to by the reference number 10, and thus, for simplicity, shall be referred to as throttle assembly 10.

Figure 1:
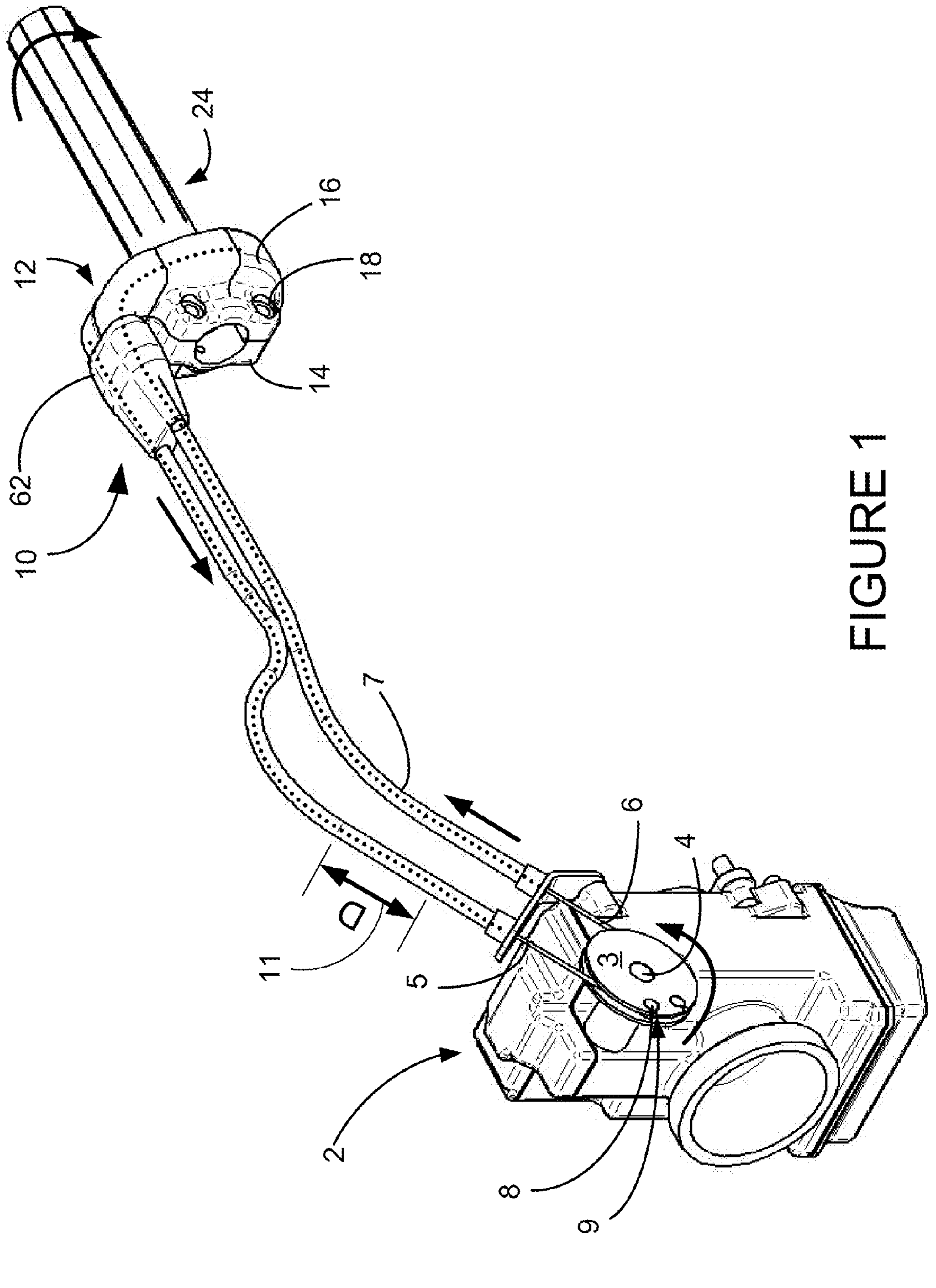
FIG. 1 shows a front isometric view of a variable rate push/pull throttle of the present invention in use with a carburetor.
Figure 2:
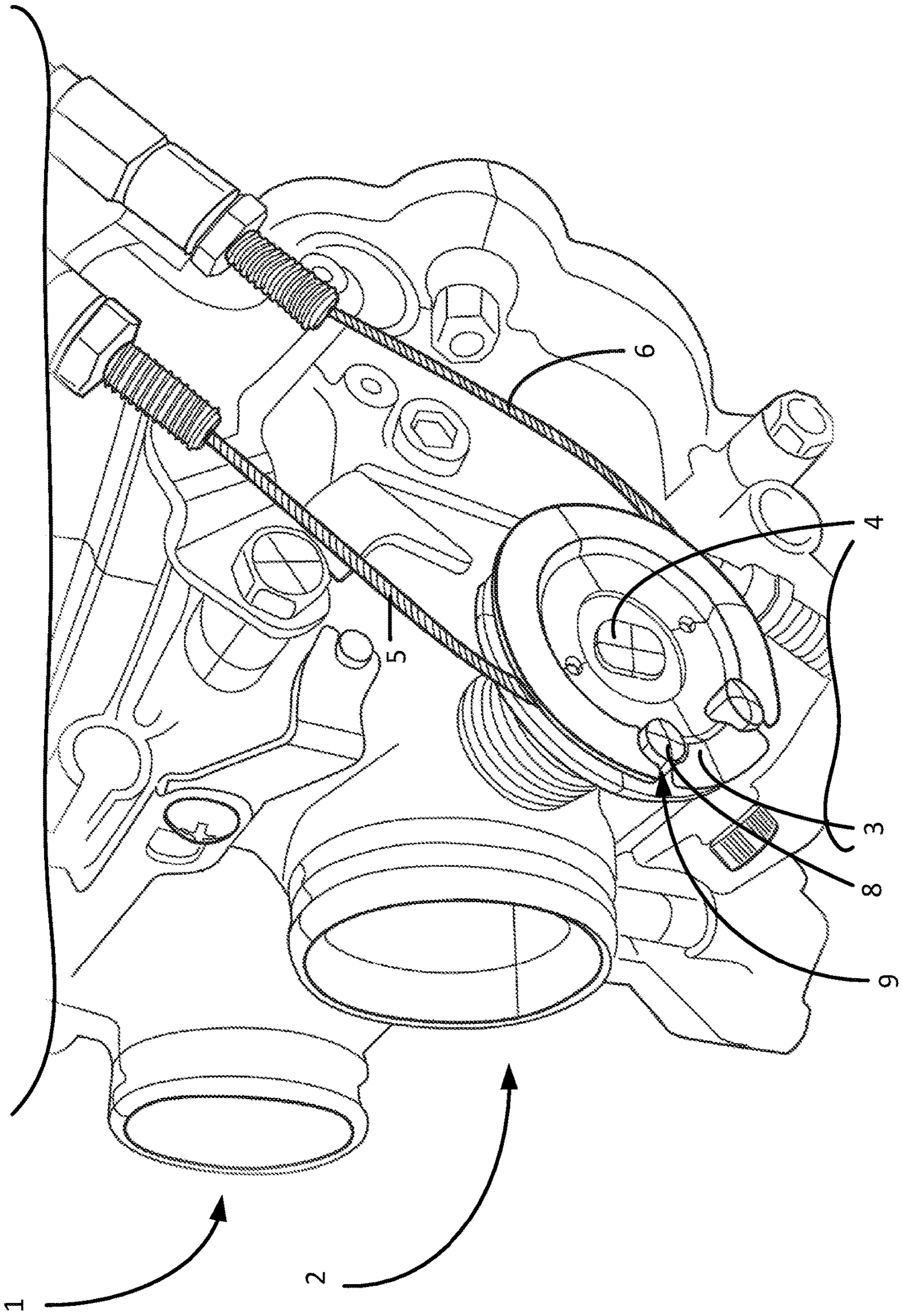
FIG. 2 shows a carburetor as used with the variable rate push/pull throttle of the present invention.
Figure 3:
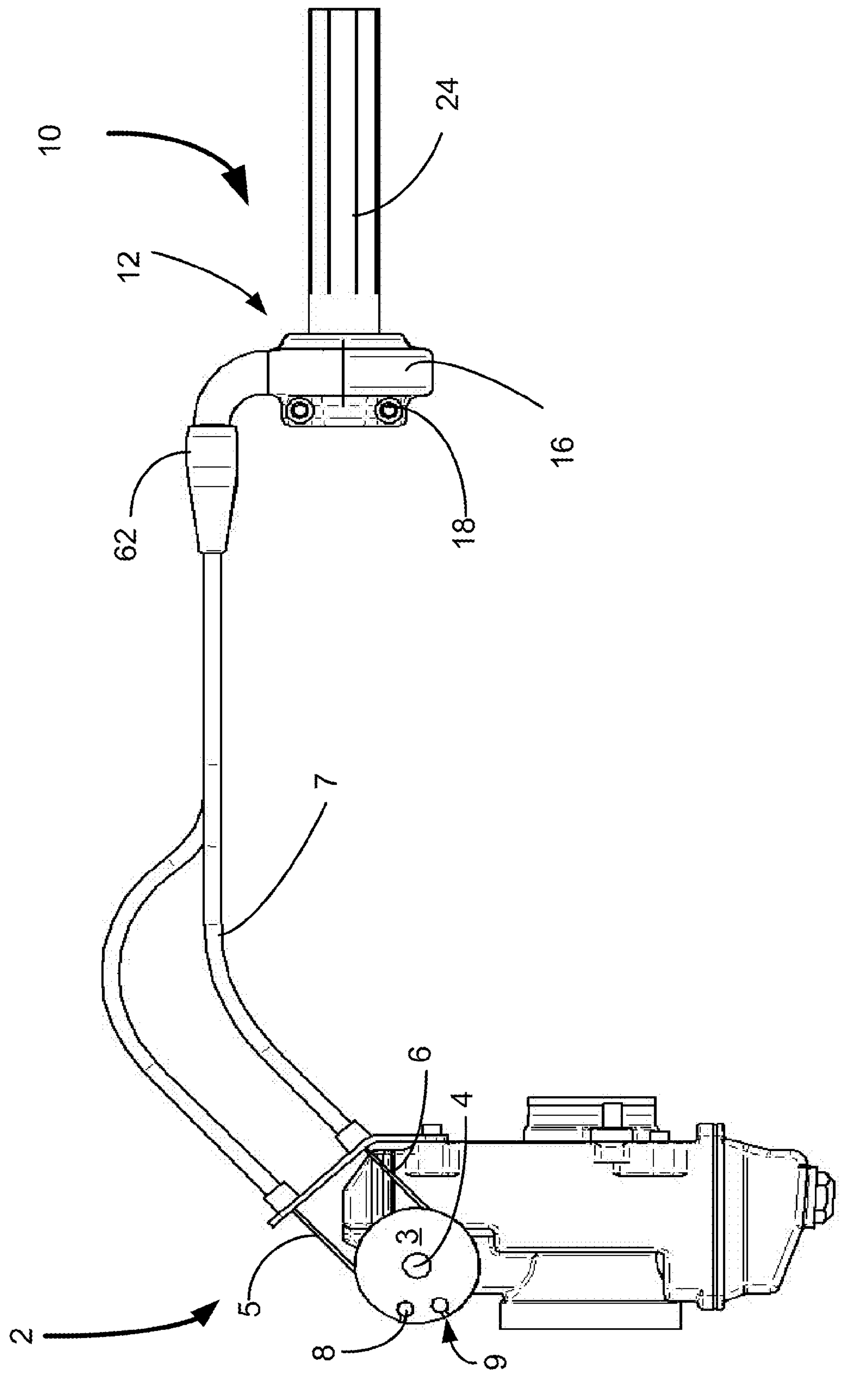
FIG. 3 shows a side plan view of a variable rate push/pull throttle of the present invention in use with a carburetor.
Figure 4:
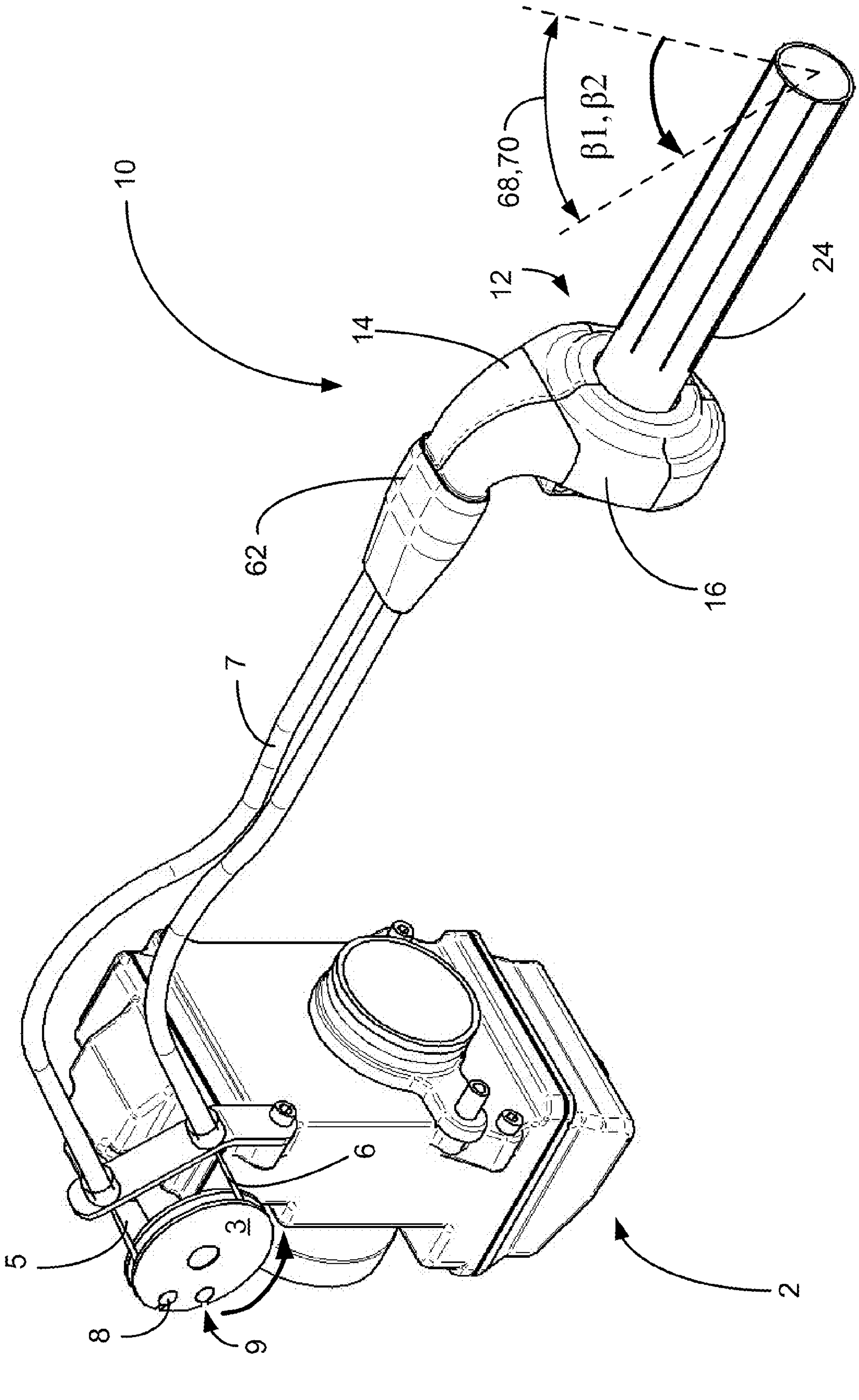
FIG. 4 shows a rear isometric view of a variable rate push/pull throttle of the present invention in use with a carburetor.

To better understand the operation of the present invention the interaction of the throttle with the carburetor should be appreciated. FIGS. 1, and 3-4 are a front isometric view, a side plan view and a rear isometric view, respectively, of a carburetor 2 and throttle assembly 10, showing the interaction of these elements. Reference is also made to FIG. 2 which shows a view of a carburetor 2 mounted on an engine 1.

Referring particularly to FIG. 2, the carburetor 2 includes a bell crank 3 rotatably mounted on a butterfly shaft 4. Rotation of the bell crank 3 controls the air-fuel mixture which is fed to the engine 1. The rotation of the bell crank 3 is enabled by a push cable 5 and a pull cable 6 which travel through cable housings 7 (see FIG. 1). The push cable 5 and pull cable 6 each include barrel wire end fittings 8 which are lodged in capture notches 9 in the bell crank 3. The push cable 5 and pull cable 6 travel through the cable housings 7 to reach the throttle assembly 10 at their other ends. It is to be understood that although a push/pull cable configuration is assumed in the following discussion, that this is not to be construed as a limitation and the present invention can be used in configurations in which there is only a pull cable involved or any other variation that will be obvious to one skilled in the art.

Figure 5:
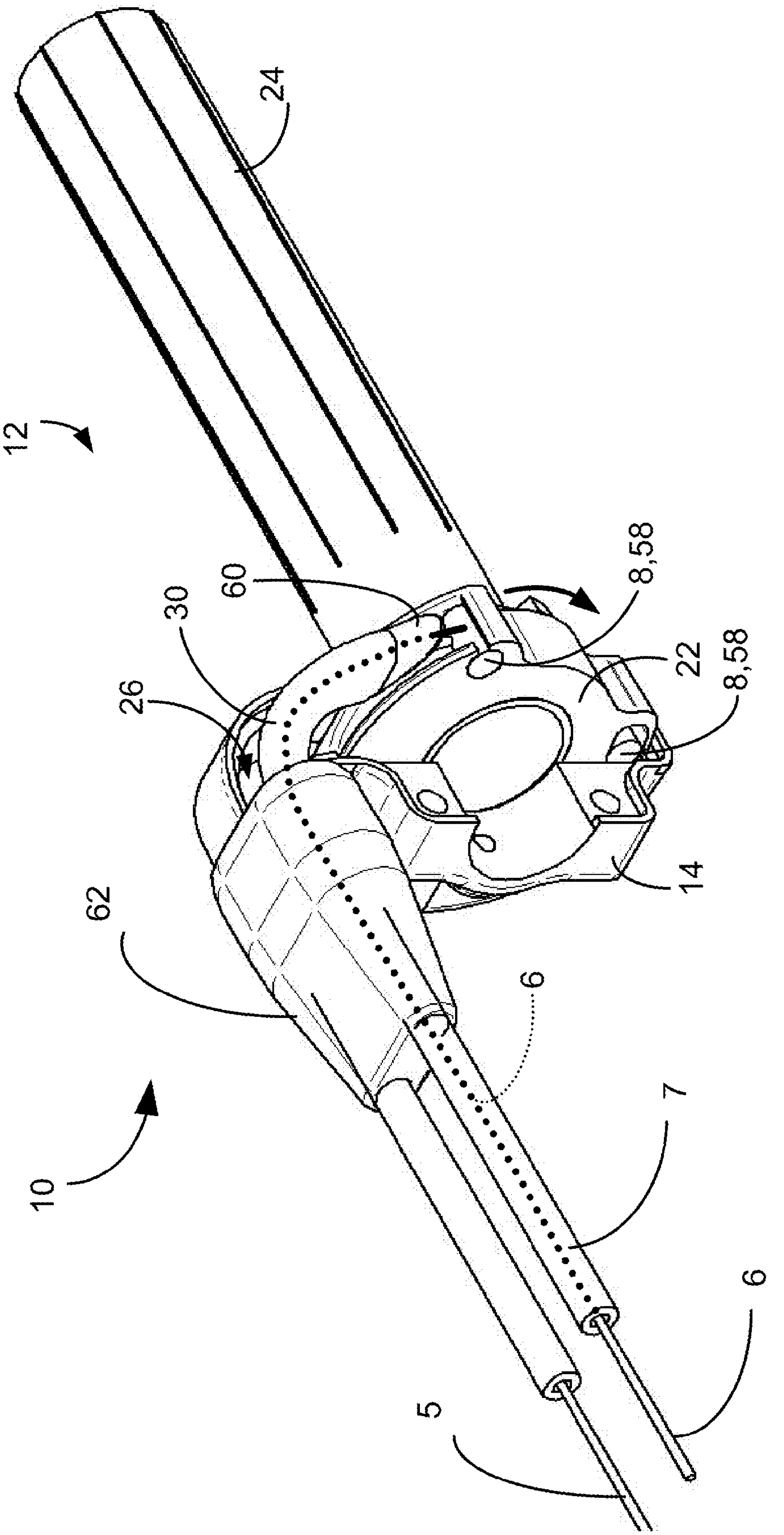
FIG. 5 shows a front isometric view of the throttle assembly of the present invention with one of the housing pieces removed.
Figure 6:
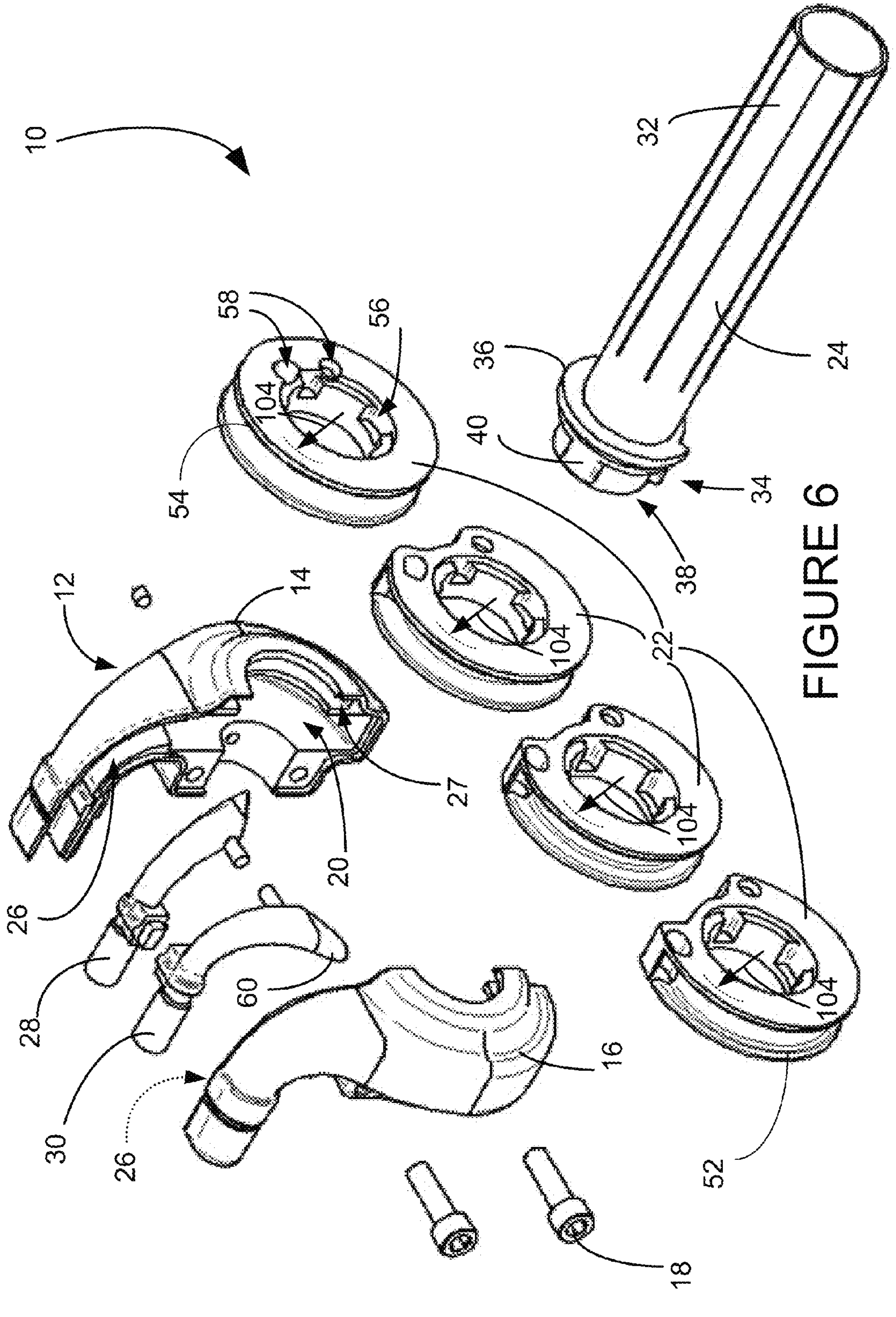
FIG. 6 shows an isometric exploded view of the major components of a variable rate push/pull throttle of the present invention.
Figure 7:
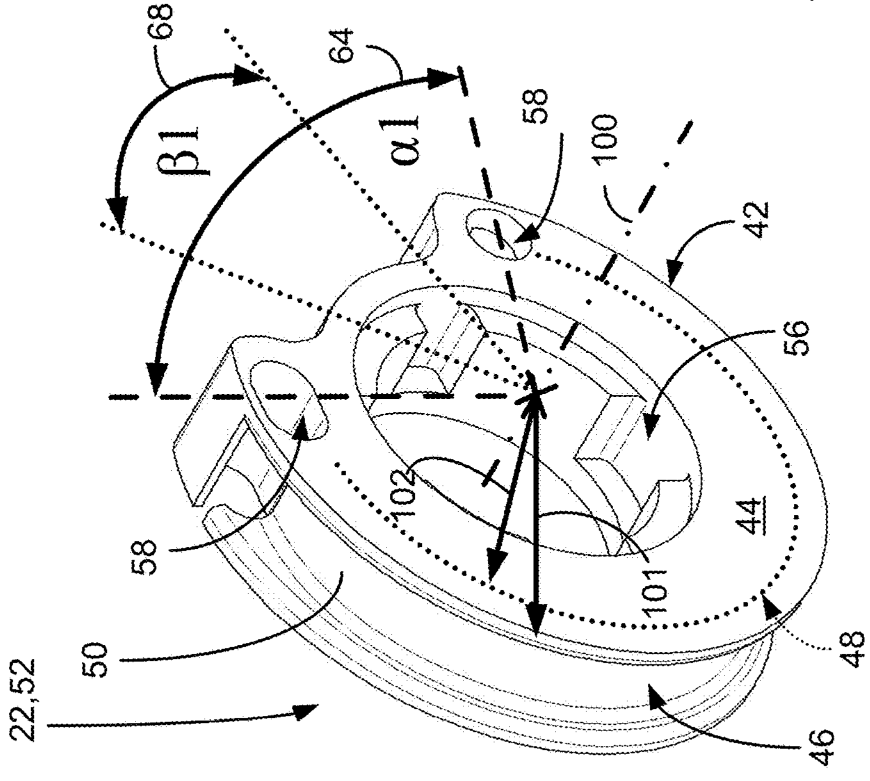
FIGS. 7 and 8 show isometric views of two variations of throttle reels of the present invention.

The throttle assembly 10 is shown in detail in FIGS. 5-7, in addition to FIGS. 1 and 3-4. The throttle assembly 10 generally includes a throttle housing 12, which includes a first housing portion 14 and a second housing portion 16, which are held together by fasteners 18, preferably socket head cap screws. The throttle housing 12 surrounds a central cavity 20 which holds one of a variety of interchangeable throttle reels 22. A throttle handle 24 is also rotatably captured by the throttle housing 12, as will be discussed in more detail below.

FIG. 6 shows an exploded view of the major components of the throttle assembly 10. The central cavity 20 includes an elongated cavity portion 26 in each of the first housing portion 14 and second housing portions 16 which receive the first elbow 28 and second elbow 30. Each of these first elbow 28 and second elbow 30 have a flared portion 60 at the end which will be located closest to the throttle reel 22 when the throttle assembly 10 is completed. The throttle handle 24 has a tube portion 32 and a head portion 34 having a retaining ring 36, an engaging shaft 38 and engaging flanges 40.

The throttle reels 22 are interchangeable, and any one of a number of variations of these throttle reels is available to be mounted in the central cavity 20 to produce a variety of throttle rates, as will be discussed below. Four of these interchangeable throttle reels 22 are shown as a set in FIG. 6, but it is to be understood that many other variations including non-constant radius profiles are possible. Two such variations are shown in detail in FIGS. 7 and 8.

Figure 8:
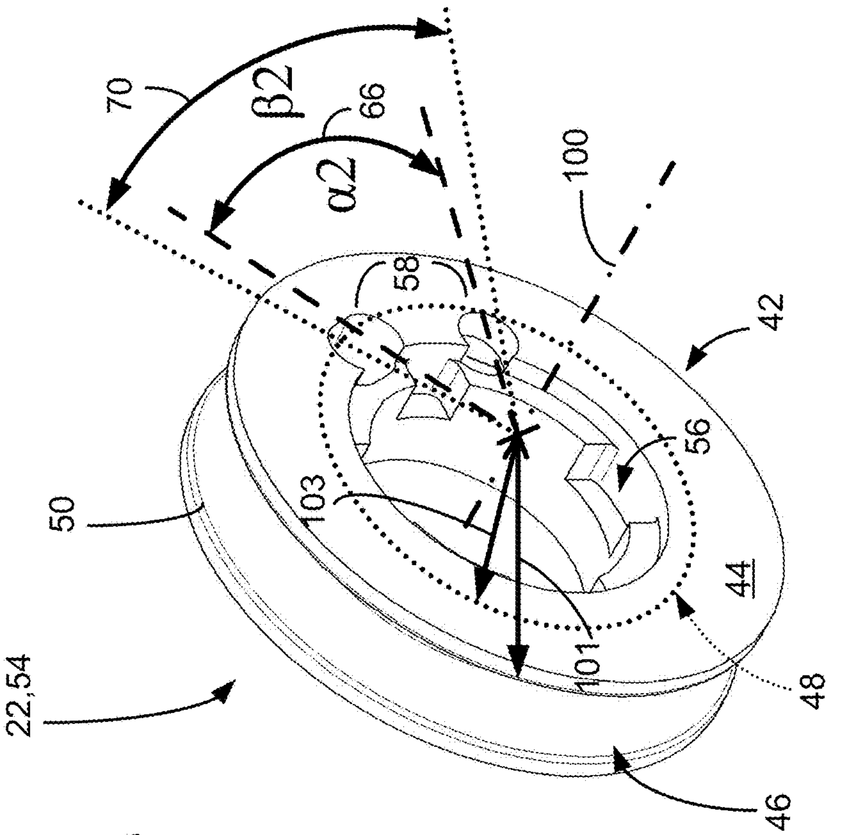

The throttle reel 22 generally includes a reel body 42 having two side walls 44 which define a groove 46 having a groove floor 48. The side portions 44 thus have a greater radial dimension than the groove floor 48, thus making a track 50 that the push cable 5 and pull cable 6 will travel upon and to which they will be confined. This is noted on FIGS. 7 and 8, wherein a central axis line 100 is shown and a side wall radius $R_1$ 101 is shown from this central axis line 100 to the outer rim of the side wall 44. FIG. 7 illustrates a first throttle reel 52 showing a second, smaller radius $R_2$ 102 extending to a dashed line corresponding to the groove floor 48, thus showing the radial distance from the central axis line 100 to the groove floor 48. FIG. 8 illustrates a second throttle reel 54 having a still smaller radius $R_3$ 103 from the central axis line 100 to the groove floor 48. In FIGS. 7 and 8, therefore $R_1>R_2>R_3$.

Both the first throttle reel 52 and second throttle reel 54 include receiving notches 56 which receive the engaging flanges 40 of the throttle handle 24 (see FIG. 6). The throttle reels 52, 54 also include capture notches 58 for barrel wire end fittings 8 for the throttle assembly 10 ends of the push cable 5 and the pull cable 6.

As discussed above, in comparing FIGS. 7 and 8, $R_2>R_3$, and it should be noted that the capture notches 58 for the first throttle reel 52 having $R_2$, are closer together than the capture notches 58 of second throttle reel 54 having $R_3$. This will be discussed in more detail below.

Returning to FIGS. 1 and 6, the push cable 5 and pull cable 6 have been inserted through the cable housings 7 and the first and second elbows 28, 30. Barrel wire end fittings 8 are attached to both ends of the cables 5, 6. The barrel wire ends 8 at the ends of the cable 5, 6 nearest the carburetor 2 are fitted to the capture notches 9 in the bell crank 3, and generally remain in this position. When the throttle assembly 10 is to be assembled, an interchangeable throttle reel 22 is selected from the provided variety of interchangeable throttle reels 22 having differing track radii $R_N$ 104 (see FIG. 6). The throttle handle 24 is positioned so that the engaging flanges 40 of the engaging shaft 38 enter the receiving notches 56 of the throttle reel 22. It should be noted that the reels 22 have been designed so that they can be installed onto the throttle handle 24 in only one direction, thus eliminating the possibility of putting the reels 22 on incorrectly. The barrel wire end fittings 8 at the throttle assembly 10 ends of the push cable 5 and pull cable 6 are placed within the capture notches 58 of the throttle reel 22. The throttle handle 24 with attached throttle reel 22 is placed within either the first or second housing portions 14, 16 of the throttle housing 12. The throttle reel 22 is positioned within the central cavity 20, and with retaining ring 36 of the throttle handle 24 is positioned within the retaining ring cavity 27. The first elbow 28 is fitted into the elongated cavity portion 26 of the first housing portion 14 and the second elbow 30 is fitted into the elongated cavity portion 26 of the second housing portion 16. The first housing portion 14 and second housing portion 16 are fitted together and attached with fasteners 18 to make the completed throttle housing 12. A boot 62 is provided (see FIG. 5) which overlaps a portion of the throttle housing 12 and prevents dirt and grime from entering the throttle assembly 10.

The push cable 5 and the pull cable 6 travel in the track 50 created between the side walls 44, and as the throttle reel 22 is rotated by rotating the attached throttle handle 24, the push and pull cables 5, 6 push and pull at their opposite ends in the manner of a pulley to rotate the bell crank 3 of the carburetor 2. The push cable 5 and pull cable 6 each travel a limited linear distance D 11 (see FIG. 1) when twisting the throttle handle 24 from an idling position to maximum acceleration. It should be noted that the reels 22 of the present invention have been designed so that the push/pull cable wires 5, 6 are captured between the side walls 44 of the reel 22 to prevent the cables from getting caught between the side of the reel 22 and throttle housing 12. This is considered to be an advantage over throttles of the prior art, which did not include this feature.

As discussed above, the throttle reels 22 are configured with varying track radii $R_N$ 104. In a throttle reel 22 with a large track radius $R_2$ 102, such as discussed earlier with regard to FIG. 7, the circumference of the throttle reel track 50 is larger than the circumference of the throttle reel track 50 when the track radius $R_3$ 103 is smaller, such as discussed with regard to FIG. 8, according to the formula Circumference=$2\pi R$. Thus, since the limited linear travel distance D 11 (see FIG. 1) of the push and pull cables 5, 6 is fixed by the carburetor or throttle body, in a throttle assembly 10 having a larger track radius $R_2$ 102 needs less angular rotation to move the push and pull cables 5, 6 the limited linear travel distance D 11. Thus, for a large track radius $R_2$ 102, the angular throttle travel range shown as $\beta 1$ 68 from minimum to maximum will be smaller than for a smaller track radius $R_3$ 103. This means that in a reel 52 with a large radius $R_2$ 102, the throttle control will be more sensitive to angular rotation. A small rotation of the throttle handle 24 will result in a large carburetor adjustment. Conversely, in a reel 54 having a small track radius $R_3$ 103, the angular throttle travel range shown as $\beta 2$ 70 between minimum and maximum will be larger, and throttle control will be less sensitive, allowing finer control over acceleration. This variable degree of throttle control or sensitivity will be referred to as throttle rate. A throttle which goes from minimum to maximum in a small angular range will be referred to as having a "fast rate", and one which has a large throttle angle range will be referred to as having a "slow rate".

The capture notches 58 in throttle reel 22 are located to compensate for the difference in circumference of the throttle reel track 50. Thus the capture notches 58 on a large track radius $R_2$ 102, are placed farther apart than the capture notches 58 on a smaller track radius $R_3$ 103. This is apparent in comparing FIGS. 7 and 8 where the separation angle of capture notches 58 for throttle reel 52 having large track radius $R_2$ 102 is shown in FIG. 7 as capture notch range angle $\alpha 1$ 64 and the capture notch range angle $\alpha 2$ 66 is shown in FIG. 8 for smaller track radius $R_3$ 103. This novel feature eliminates the need to adjust the cables 5, 6 when changing reels 22 with varying track radii $R_N$ 104.

The variable rate has several advantages. In an essentially flat, level terrain, it may be desirable to obtain maximum acceleration very quickly, thus a fast rate may be desirable. However, in more rugged terrain, in the woods or in wet or muddy conditions, a slow rate may be better, to assure that too much acceleration is not applied, or that it should be applied with more discrimination. The interchangeable throttle reels 22 allow a rate to be selected from a variety of choices.

Figure 9:
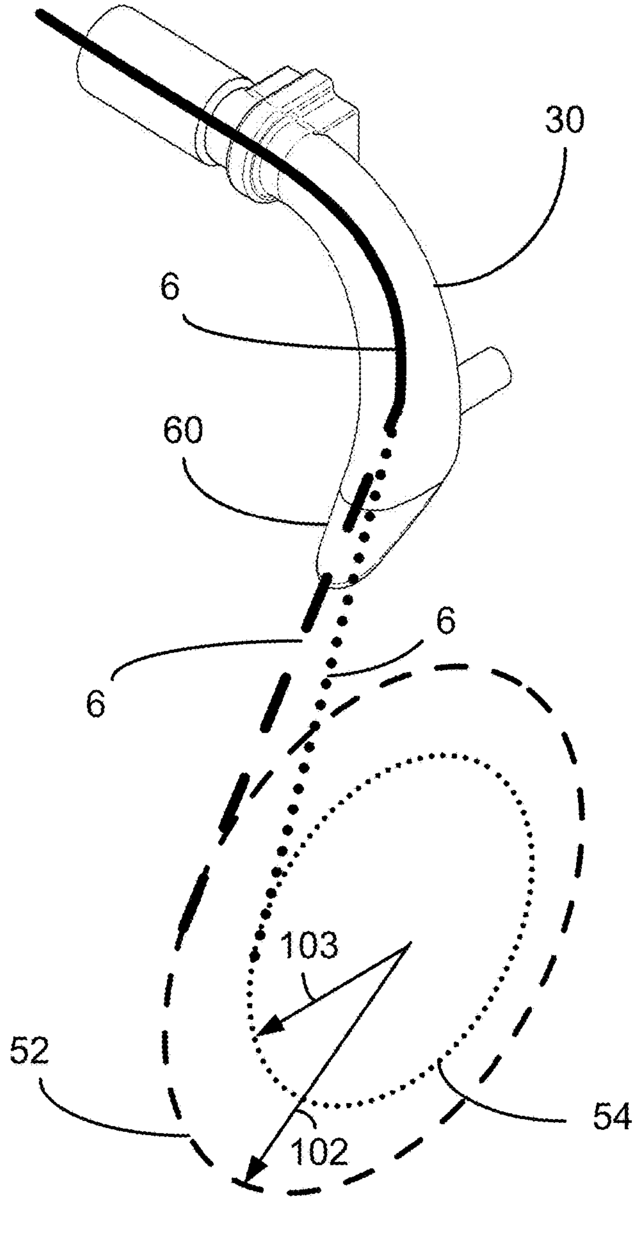
FIG. 9 illustrates an isometric view of a first elbow of the present invention showing the path of a cable attached to throttle reels of varying radius.

In conjunction with the variable throttle reels 22, the configuration of the elbows 28, 30 is important. The flared portion 60 of the elbows 28, 30 was referred to above and pointed out in FIG. 6. A detailed view is provided in FIG. 9 showing an elbow 30 with dashed circles which represent the radii 102, 103 of the first and second throttle reels 22 discussed above. A portion of pull cable 6 is shown routed through the elbow 30 and attaching to the circumference of the dashed lines. It can be seen how the angle of the cable 6 varies as it leaves the confines of the elbow 30 and attaches to the first and second throttle reels 52, 54 at their radii 102, 103.

The flared portion 60 feature is important because with the variation in track radii $R_N$ 104 possible, the angle at which the push and pull cables 5, 6 emerge from the elbows 28, 30 and wrap around the reel tracks 50 will vary as demonstrated in FIG. 9. By providing the flared portion 60, the push and pull cables 5, 6 are free to run naturally into groove 46 in the reel 22 without binding to ensure a precise and smooth operation with excellent throttle return characteristics. It can be appreciated that without the flared portion 60, the pull cable 6 (and also push cable 5, in a similar manner) would abrade at the exit of elbows 28, 30. If the cables were constrained to exit at a steep angle and to rub on the elbows 28, 30, there would be more friction, leading to a throttle that drags and possibly hold the throttle in the open position requiring the operator to use the push cable to close it. This is thus an important and novel feature.

It is noted that the capture notch locations for the push/pull cable have been designed so that the throttle handle will not rotate on the handlebar when you change throttle reels having varying track radii. This eliminates the need to make cable adjustments when using a directional grip with a specific pattern that requires it to be kept in the same position for rider comfort and or performance. (i.e. half waffle, etc.) This is considered to be a considerable advantage.

It is also noted that capture notches on the reels have been located to prevent the need to adjust the cables when changing the reels. There is little or no "slack" to be adjusted for when changing the reels. This, too, is considered to be a considerable advantage.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

INDUSTRIAL APPLICABILITY

The present variable throttle 10 is well suited generally for use in motorcycles and other small vehicles. Acceleration of the vehicle ranges from a minimum, where the engine idles, to maximum acceleration, and the opening of the butterfly valves in the carburetor or throttle body over this range can vary from a gradual increase over a relatively large angular twist range of the hand throttle to a very sharp increase from minimum to maximum over a relatively small twist range of the hand throttle.

If the carburetor or throttle body control is sensitive to angular rotation, a small rotation of the hand throttle will result in a large carburetor or throttle body adjustment. Conversely, if the carburetor or throttle body control is less sensitive, the hand throttle twist range between minimum and maximum acceleration will be larger, allowing finer control. This degree of control or sensitivity will be referred to as the "throttle rate". A throttle which goes from minimum to maximum in a small angular range will be referred to as having a "fast rate", and one which has a large throttle angle range will be referred to as having a "slow rate".

It is well known that different throttle rates are useful for different situations and environments. For example, a rider in the desert who is on very flat terrain with no obstacles may be primarily interested in applying maximum acceleration as quickly as possible, and therefore a more sensitive throttle with a fast rate may be preferred. Conversely, a rider in the woods who is operating in hilly terrain, or in rain or mud-slickened conditions, may want to have more precise control, and thus a less sensitive throttle with a slow rate is preferred.

Typically, a vehicle is configured to have a fixed throttle rate, which is not variable. Modifying the throttle rate is typically not an operation which is easily done. A variable throttle which can facilitate this operation in a quick and easy manner will have great utility and industrial applicability.

The present variable throttle 10 includes throttle reels 22 that are interchangeable, and any one of a number of variations of these throttle reels is available to be mounted in the central cavity 20 to produce a variety of throttle rates.

The interchangeable throttle reel 22 generally includes a reel body 42 having two side walls 44 which define a groove 46 having a groove floor 48. The side portions 44 thus have a greater radial dimension than the groove floor 48, thus making a track 50 that the push cable 5 and pull cable 6 will travel upon and to which they will be confined.

As examples of the operation of the variable throttle 10, a first throttle reel 52 includes a second, smaller radius $R_2$ 102 extending to a dashed line corresponding to the groove floor 48, thus showing the radial distance from the central axis line 100 to the groove floor 48. A second throttle reel 54 includes a still smaller radius $R_3$ 103 from the central axis line 100 to the groove floor 48.

Both the first throttle reel 52 and second throttle reel 54 include receiving notches 56 which receive the engaging flanges 40 of the throttle handle 24. The throttle reels 52, 54 also include capture notches 58 for barrel wire end fittings 8 for the throttle assembly 10 ends of the push cable 5 and the pull cable 6. The capture notches 58 for the first throttle reel 52 having $R_2$, are closer together than the capture notches 58 of second throttle reel 54 having $R_3$.

The push cable 5 and pull cable 6 are inserted through the cable housings 7 and the first and second elbows 28, 30. Barrel wire end fittings 8 are attached to both ends of the cables 5, 6. The barrel wire ends 8 at the ends of the cable 5, 6 nearest the carburetor 2 are fitted to the capture notches 9 in the bell crank 3, and generally remain in this position. When the throttle assembly 10 is to be assembled, an interchangeable throttle reel 22 is selected from the provided variety of throttle reels 22 having differing track radii $R_N$ 104. The throttle handle 24 is positioned so that the engaging flanges 40 of the engaging shaft 38 enter the receiving notches 56 of the throttle reel 22. It should be noted that the reels 22 have been designed so that they can be installed onto the throttle handle 24 in only one direction, thus eliminating the possibility of putting the reels 22 on incorrectly. The barrel wire end fittings 8 at the throttle assembly 10 ends of the push cable 5 and pull cable 6 are placed within the capture notches 58 of the throttle reel 22. The throttle handle 24 with attached throttle reel 22 is placed within either the first or second housing portions 14, 16 of the throttle housing 12. The throttle reel 22 is positioned within the central cavity 20, and with retaining ring 36 of the throttle handle 24 is positioned within the retaining ring cavity 27. The first elbow 28 is fitted into the elongated cavity portion 26 of the first housing portion 14 and the second elbow 30 is fitted into the elongated cavity portion 26 of the second housing portion 16. The first housing portion 14 and second housing portion 16 are fitted together and attached with fasteners 18 to make the completed throttle housing 12. A boot 62 is provided which overlaps a portion of the throttle housing 12 and prevents dirt and grime from entering the throttle assembly 10.

The push cable 5 and the pull cable 6 travel in the track 50 created between the side walls 44, and as the throttle reel 22 is rotated by rotating the attached throttle handle 24, the push and pull cables 5, 6 push and pull at their opposite ends in the manner of a pulley to rotate the bell crank 3 of the carburetor 2. The push cable 5 and pull cable 6 each travel a limited linear distance D 11 when twisting the throttle handle 24 from an idling position to maximum acceleration. The push/pull cable wires 5, 6 are captured between the side walls 44 of the reel 22 to prevent the cables from getting caught between the side of the reel 22 and throttle housing 12.

The throttle reels 22 are configured with varying track radii $R_N$ 104. In a throttle reel 22 with a large track radius $R_2$ 102, the circumference of the throttle reel track 50 is larger than the circumference of the throttle reel track 50 when the track radius $R_3$ 103 is smaller, according to the formula Circumference=$2\pi R$. Thus, since the limited linear travel distance D 11 of the push and pull cables 5, 6 is fixed by the carburetor or throttle body, in a throttle assembly 10 having a larger track radius $R_2$ 102 needs less angular rotation to move the push and pull cables 5, 6 the limited linear travel distance D 11. Thus, for a large track radius $R_2$ 102, the angular throttle travel range shown as $\beta 1$ 68 from minimum to maximum will be smaller than for a smaller track radius $R_3$ 103. This means that in a reel 52 with a large radius $R_2$ 102, the throttle control will be more sensitive to angular rotation. A small rotation of the throttle handle 24 will result in a large carburetor adjustment. Conversely, in a reel 54 having a small track radius $R_3$ 103, the angular throttle travel range shown as $\beta 2$ 70 between minimum and maximum will be larger, and throttle control will be less sensitive, allowing finer control over acceleration. This variable degree of throttle control or sensitivity will be referred to as throttle rate. A throttle which goes from minimum to maximum in a small angular range will be referred to as having a "fast rate", and one which has a large throttle angle range will be referred to as having a "slow rate".

The capture notches 58 in throttle reel 22 are located to compensate for the difference in circumference of the throttle reel track 50. Thus the capture notches 58 on a large track radius $R_2$ 102, are placed farther apart than the capture notches 58 on a smaller track radius $R_3$ 103.

In conjunction with the variable throttle reels 22, the configuration of the elbows 28, 30 is important. The flared portion 60 of the elbows 28, 30 is important because with the variation in track radii $R_N$ 104 possible, the angle at which the push and pull cables 5, 6 emerge from the elbows 28, 30 and wrap around the reel tracks 50 will vary. By providing the flared portion 60, the push and pull cables 5, 6 are free to run naturally into groove 46 in the reel 22 without binding to ensure a precise and smooth operation with excellent throttle return characteristics. It can be appreciated that without the flared portion 60, the pull cable 6 (and also push cable 5, in a similar manner) would abrade at the exit of elbows 28, 30. If the cables were constrained to exit at a steep angle and to rub on the elbows 28, 30, there would be more friction, leading to a throttle that drags and possibly hold the throttle in the open position requiring the operator to use the push cable to close it.

The capture notch locations for the push/pull cable have been designed so that the throttle handle will not rotate on the handlebar when the user is to change throttle reels having varying track radii. This eliminates the need to make cable adjustments when using a directional grip with a specific pattern that requires it to be kept in the same position for rider comfort and or performance.

Capture notches on the reels have been located to prevent the need to adjust the cables when changing the reels. There is little or no "slack" to be adjusted for when changing the reels.

In changing from a "fast" variable rate, such as used on flat terrain, where fast acceleration is desired, to a "slower" rate, an operator would be involved in changing a reel 52 with a large radius $R_2$ 102, to a reel 54 having a small track radius $R_3$ 103, where the throttle control will be less sensitive, allowing finer control over acceleration.

To accomplish this, the throttle assembly 10 is partially disassembled. The boot 62 is disengaged from the throttle housing 12 by sliding it down the cable housing 7. Fasteners 18 are then loosened, allowing the first housing portion 14 and second housing portion 16 to be separated. Handle 24 is then withdrawn so that engaging flanges 40 disengage from the receiving notches 56 in the reel 52. The barrel wire end fittings 8 of the pull cable 6 and the push cable 5 are then removed from the capture notches 58 of the reel 52, and the reel 52 is thus disengaged from the throttle assembly 10. A new reel 54 of appropriate throttle rate is then selected, and the barrel wire end fittings 8 of the pull cable 6 and the push cable 5 are then inserted into the capture notches 58 of the reel 54. The handle 24 is then replaced so that engaging flanges 40 engage the receiving notches 56 in the reel 54. The first housing portion 14 and second housing portion 16 are reassembled and fasteners 18 are then used to attach the housing portions 14, 16. The boot 62 is the slipped up the cable housing 7 to re-engage the throttle housing 12, and the vehicle is ready to be operated.

Thus, it is apparent that the replacement of the throttle reels is a very quick and easy operation, and far superior to previous methods of modification, which may require the user to grind off material or add more material, such as epoxy and then file it smooth.

For the above, and other, reasons, it is expected that the variable throttle 10 of the present invention will have widespread industrial applicability. Therefore, it is expected that the commercial utility of the present invention will be extensive and long lasting.

What is claimed is:

1. A variable rate throttle for controlling a vehicle carburetor having control cables, comprising:

a housing surrounding a cavity;

a plurality of interchangeable throttle reels, each having a different track radius, where a particular one of said interchangeable throttle reels is positioned at a time in said cavity of said housing and which engages said control cables; and a throttle handle which engages said interchangeable throttle reel so that rotation of said handle causes rotation of said throttle reel and moves said control cables, wherein said rotation of said throttle handle is within an angular throttle travel range which corresponds to the particular track radius of said particular one of said interchangeable throttle reels which is positioned within said cavity of said housing.

2. The variable rate throttle of claim 1 wherein said interchangeable throttle reels include capture notches by which said control cables are engaged in said interchangeable throttle reels.

3. The variable rate throttle of claim 2 wherein each of said capture notches are separated by a capture notch range angle which correlates with the track radius of the particular throttle reel of said plurality of said interchangeable throttle reels.

4. The variable rate throttle of claim 1 further comprising a boot.

5. The variable rate throttle of claim 1, wherein said housing comprises a first housing portion and a second housing portion.

6. The variable rate throttle of claim 1, further comprising a first elbow and a second elbow which channel and direct said control cables within said housing.

7. The variable rate throttle of claim 6, wherein each of said first and second elbows include flared portions.

8. The variable rate throttle of claim 1 wherein said throttle handle includes engaging flanges and said interchangeable throttle reels include receiving notches, wherein said engaging flanges engage said receiving notches.

9. The variable rate throttle of claim 8, wherein said engaging flanges can only engage said receiving notches when said interchangeable throttle reels are correctly oriented.

10. The variable rate throttle of claim 1, wherein said plurality of interchangeable throttle reels include side walls between which said control cables are channeled.

11. A variable rate throttle comprising:

a plurality of throttle reels each having a different track radius, each of said throttle reels having capture notches to engage push and pull control cables of a carburetor, said plurality of throttle reels providing a variety of throttle travel ranges and thus a variety of throttle rates; and a housing surrounding a cavity for holding one of said plurality of throttle reels.

12. The variable rate throttle of claim 11 wherein each of said capture notches includes a capture notch range angle which correlates with the various track radii of each of said plurality of said throttle reels.

13. The variable rate throttle of claim 11, further comprising a throttle handle which engages said throttle reel so that rotation of said handle causes rotation of said throttle reel.

14. The variable rate throttle of claim 13 wherein said throttle handle includes engaging flanges and said throttle reels include receiving notches, wherein said engaging flanges engage said receiving notches.

15. The variable rate throttle of claim 14, wherein said engaging flanges can only engage said receiving notches when said variable rate throttle reels are correctly oriented.

16. The variable rate throttle of claim 11, wherein said housing comprises a first housing portion and a second housing portion.

17. The variable rate throttle of claim 11, further comprising a first elbow and a second elbow which channel and direct said control cables within said housing.

18. The variable rate throttle of claim 17, wherein each of said first and second elbows include flared portions.

19. A set of interchangeable throttle reels for use in a variable rate throttle having a housing and a handle, and for use in controlling cables from a carburetor, the set of throttle reels comprising:

a plurality of throttle reels, each particular throttle reel having a reel body including side walls which define a groove, a groove floor having a track having a track radius selected from a variety of track radii, capture notches configured to engage control cables of a carburetor, said capture notches having a capture notch range angle, which correlate to the particular track radius of the particular throttle reel.

20. The set of interchangeable throttle reels of claim 19, further comprising:

receiving notches for receiving engaging flanges of a throttle handle, by which the throttle handle rotates said particular throttle reel.

* * * * *